(12) United States Patent
Nakamura et al.

(10) Patent No.: US 12,470,069 B2
(45) Date of Patent: Nov. 11, 2025

(54) DC POWER SUPPLY SYSTEM

(71) Applicant: NTT DOCOMO, INC., Tokyo (JP)

(72) Inventors: Masaki Nakamura, Chiyoda-ku (JP); Tomoki Tatsuno, Chiyoda-ku (JP); Kazuhiko Takeno, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/836,088

(22) PCT Filed: Jan. 12, 2023

(86) PCT No.: PCT/JP2023/000683
§ 371 (c)(1),
(2) Date: Aug. 6, 2024

(87) PCT Pub. No.: WO2023/176115
PCT Pub. Date: Sep. 21, 2023

(65) Prior Publication Data
US 2025/0158412 A1    May 15, 2025

(30) Foreign Application Priority Data
Mar. 14, 2022  (JP) .................................. 2022-039126

(51) Int. Cl.
H02J 3/38          (2006.01)
H02J 3/32          (2006.01)
(Continued)

(52) U.S. Cl.
CPC ....... *H02J 3/38* (2013.01); *H02J 3/32* (2013.01); *H02J 7/00712* (2020.01); *H02J 7/35* (2013.01); *H02J 2300/24* (2020.01)

(58) Field of Classification Search
CPC .. H02J 3/38; H02J 7/00; H02J 7/00712; H02J 3/32; H02J 7/35; H02J 2300/24
See application file for complete search history.

(56) References Cited

FOREIGN PATENT DOCUMENTS

| JP | 2011-172454 A | 9/2011 |
|----|---------------|--------|
| JP | 2012-221151 A | 11/2012 |

(Continued)

OTHER PUBLICATIONS

International Preliminary Report on Patentability and Written Opinion Issued Sep. 26, 2024 in PCT/JP2023/000683, (with English translation), 6 pages.

(Continued)

*Primary Examiner* — Robert L Deberadinis
(74) *Attorney, Agent, or Firm* — Oblon, McClelland, Maier & Neustadt, L.L.P.

(57) ABSTRACT

An objective is to provide a direct current (DC) power supply system capable of maximally generating electric power in a solar power generation process in consideration of an operation state of a load device serving as a power supply destination. In a rectifier (100), a traffic volume acquisition unit (102*a*) acquires an operation state (traffic volume) of a communication device (300), and a power calculation unit (102*b*) acquires power consumption of the communication device (300) corresponding to the traffic volume. Moreover, the power calculation unit (102*b*) acquires output power from the rectifier (100). A power comparison unit (102*d*) acquires electric power generated by a solar power generation device (200) on the basis of power consumption (W) of the communication device (300) and output power (P') of the rectifier (100). A search operation voltage decision unit (102*f*) decides a rectifier voltage of the rectifier (100) using a sign of a search voltage (dv) decided by a sign inversion unit (102*e*) so that the electric power generated by the solar power generation device (200) is increased.

14 Claims, 9 Drawing Sheets

(51) Int. Cl.
*H02J 7/00* (2006.01)
*H02J 7/35* (2006.01)

(56) References Cited

FOREIGN PATENT DOCUMENTS

| | | |
|---|---|---|
| JP | 2014-42417 A | 3/2014 |
| JP | 2014-157574 A | 8/2014 |

OTHER PUBLICATIONS

International Search Report mailed on Mar. 28, 2023 in PCT/JP2023/000683 filed on Jan. 12, 2023 (2 pages).

DC POWER SUPPLY SYSTEM

TECHNICAL FIELD

The present invention relates to a direct current (DC) power supply system using a solar power generation process.

BACKGROUND ART

In Patent Literature 1, a control device for a solar power generation device that can control the solar power generation device to achieve maximum power in a simple calculation process is disclosed. In Patent Literature 1, a process in which the control device obtains an operation voltage at which electric power is maximized by changing the operation voltage of the solar power generation device step by step from a lower limit to an upper limit of an operable range of a power conversion device is disclosed.

CITATION LIST

Patent Literature

[Patent Literature 1] Japanese Unexamined Patent Publication No. 2012-221151

SUMMARY OF INVENTION

Technical Problem

In recent years, the use of natural energy of a solar power generation process or the like has attracted attention and the solar power generation process has been increasingly implemented in facilities and houses. However, at present, most DC power generated in the solar power generation process is converted into alternating current (AC) power by a power conditioner so that the AC power is used. However, because there are many devices and facilities that operate with a DC current, the conversion loss of DC current-AC current-DC current will occur in this case. In order to reduce this conversion loss, DC power feeding systems are also attracting attention. In particular, because communication facilities (base stations for wireless communication and the like) are equipped with storage batteries, there are many examples in which a DC power supply of 48 V is used.

In this case, a voltage of an AC power supply of a commercial power system is converted into a DC voltage of about 48 V by a rectifier and connected to the storage battery and a communication facility with a DC current. When a solar power generation process is added to this, three DC power sources, i.e., a system power supply (a DC voltage of 48 V) from a commercial power system, a storage battery, and a solar power generation process, are connected to a load. Therefore, it is necessary to control these three power sources for an efficient operation.

Therefore, in order to solve the above-described problems, an objective of the present invention is to provide a DC power supply system capable of maximally generating electric power in a solar power generation process in consideration of an operation state of a load device serving as a power supply destination.

Solution to Problem

According to the present invention, there is provided a DC power supply system having a rectifier connected to commercial power and configured to supply electric power to a load device and a solar power generation process of supplying electric power to the load device, the DC power supply system including: a power consumption acquisition unit configured to acquire power consumption of the load device corresponding to an operation state of the load device; an output power acquisition unit configured to acquire output power from the rectifier; a generated solar power acquisition unit configured to acquire electric power generated in the solar power generation process on the basis of the power consumption and the output power; and a voltage control unit configured to control a rectifier voltage of the rectifier so that the electric power generated in the solar power generation process is increased.

Advantageous Effects of Invention

According to the present invention, it is possible to maximally utilize electric power generated in a solar power generation process even if power consumption of a load device changes.

DESCRIPTION OF EMBODIMENTS

Hereinafter, embodiments of the present disclosure will be described with reference to the accompanying drawings. If possible, the same parts are denoted by the same reference signs and redundant description thereof will be omitted.

Embodiment 1

Figure 1:
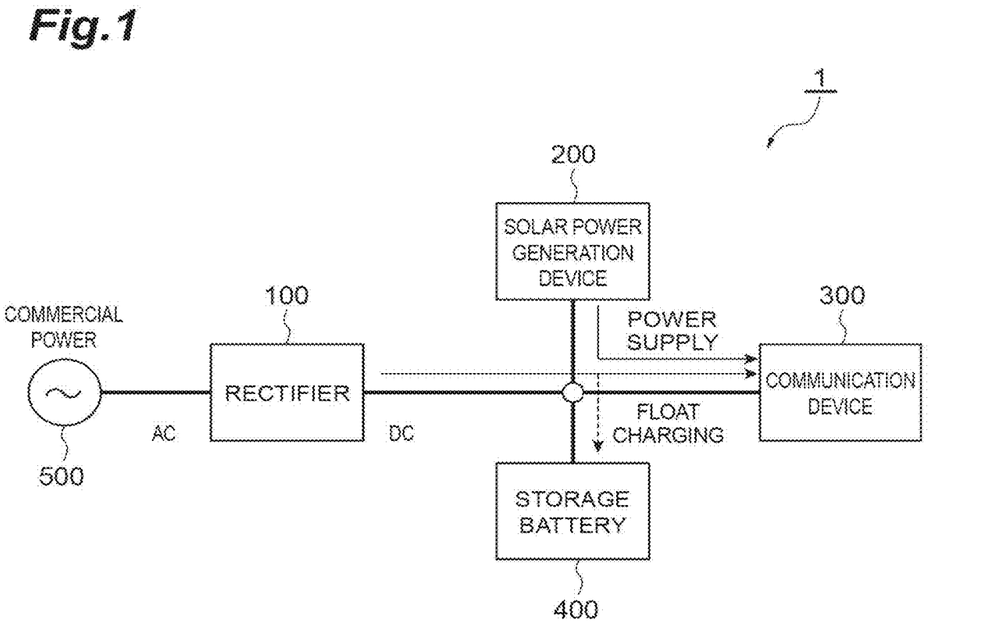
FIG. 1 shows a configuration of a DC power supply system having a solar power generation process.

FIG. 1 is a diagram showing a system configuration of a DC power supply system 1 in the present disclosure. As shown in FIG. 1, in the present disclosure, a communication device 300 is a load device and electric power is supplied from commercial power 500, a solar power generation device 200, and a storage battery 400 to the communication device 300. A rectifier 100 is a device that converts an AC current from the commercial power 500, which is an AC power supply, into a DC current.

As shown in FIG. 1, the solar power generation device 200 is directly connected to a 48 V bus, and electric power generated by the solar power generation device 200 is preferentially supplied to the communication device 300 that is a load. In the case of this configuration, the solar power generation device 200 operates with a rectifier voltage of the rectifier 100.

Figure 2:
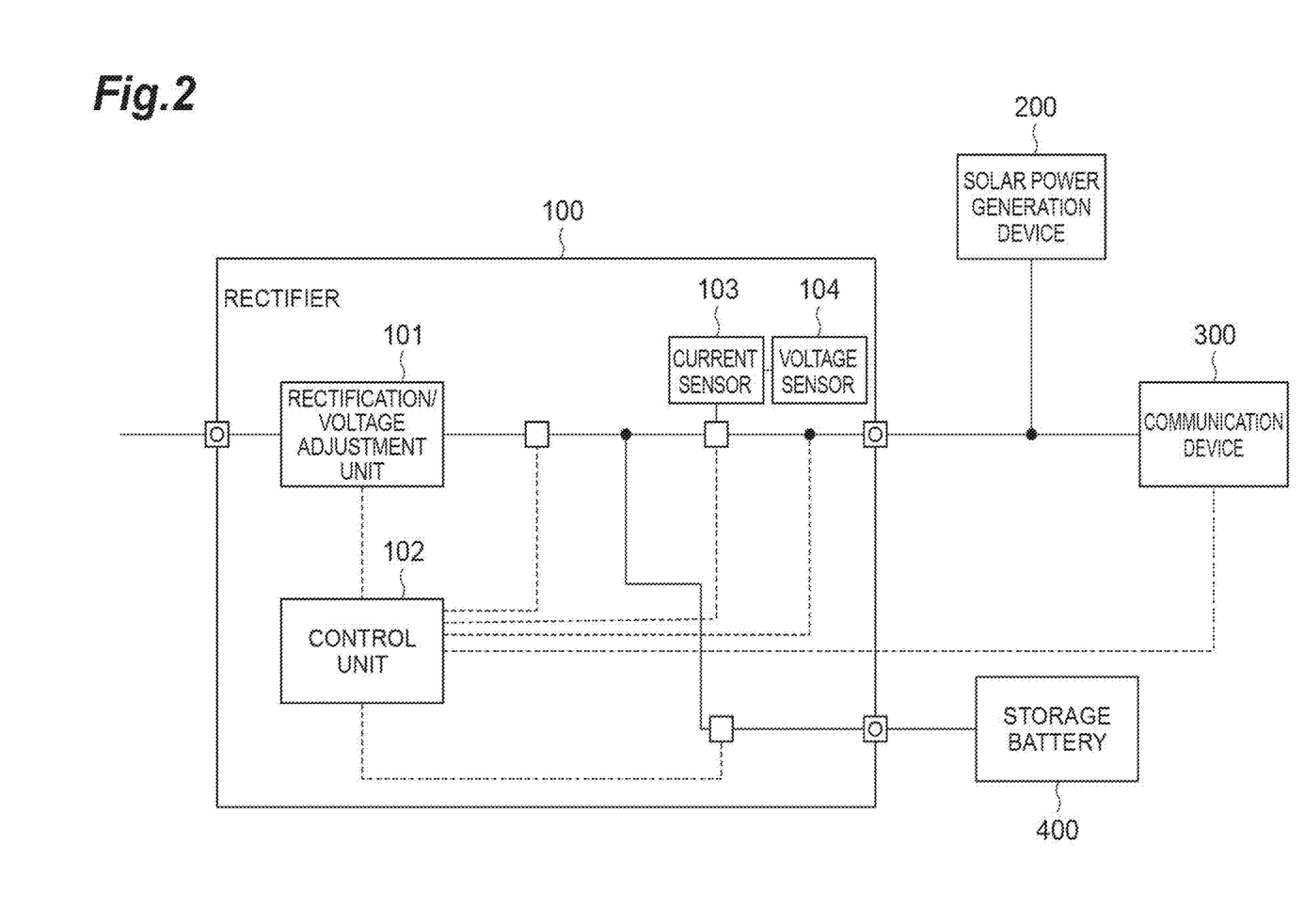
FIG. 2 is a configuration diagram of a rectifier 100 according to Embodiments 1 and 2 of the present disclosure.
Figure 3:
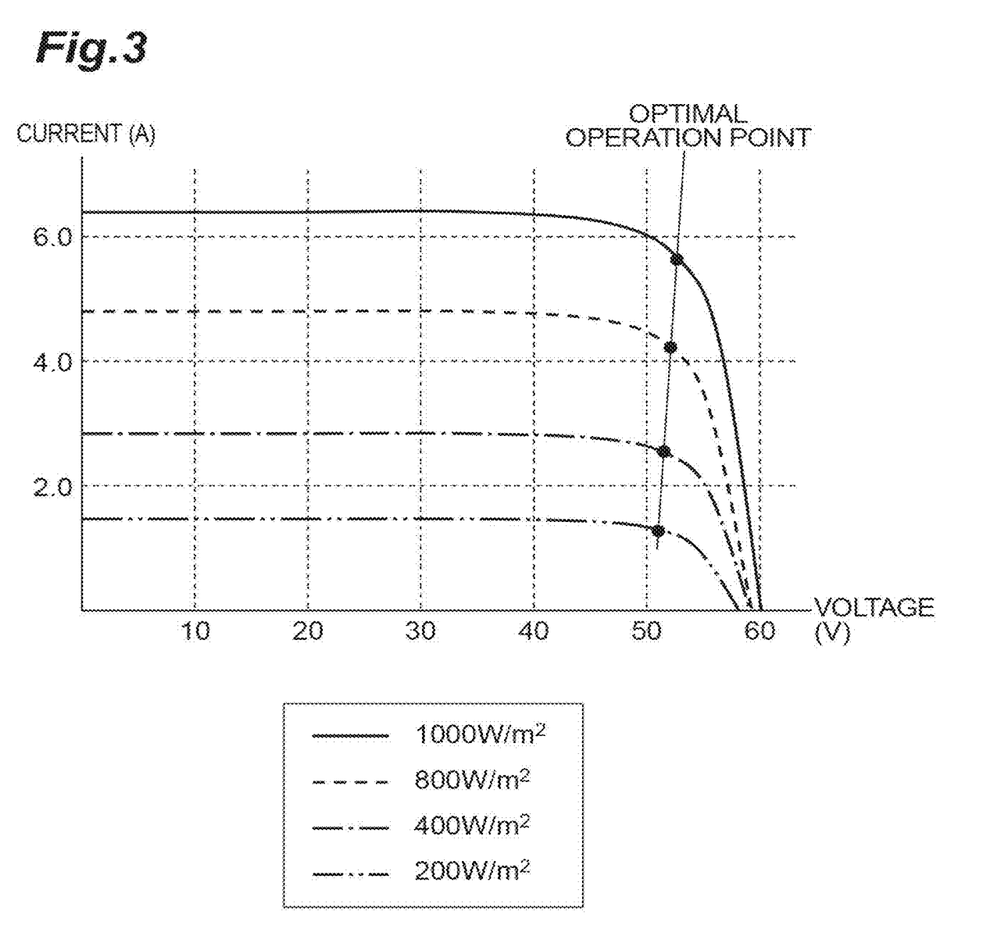
FIG. 3 is a diagram showing an example of an I-V characteristic in the solar power generation process.
Figure 4:
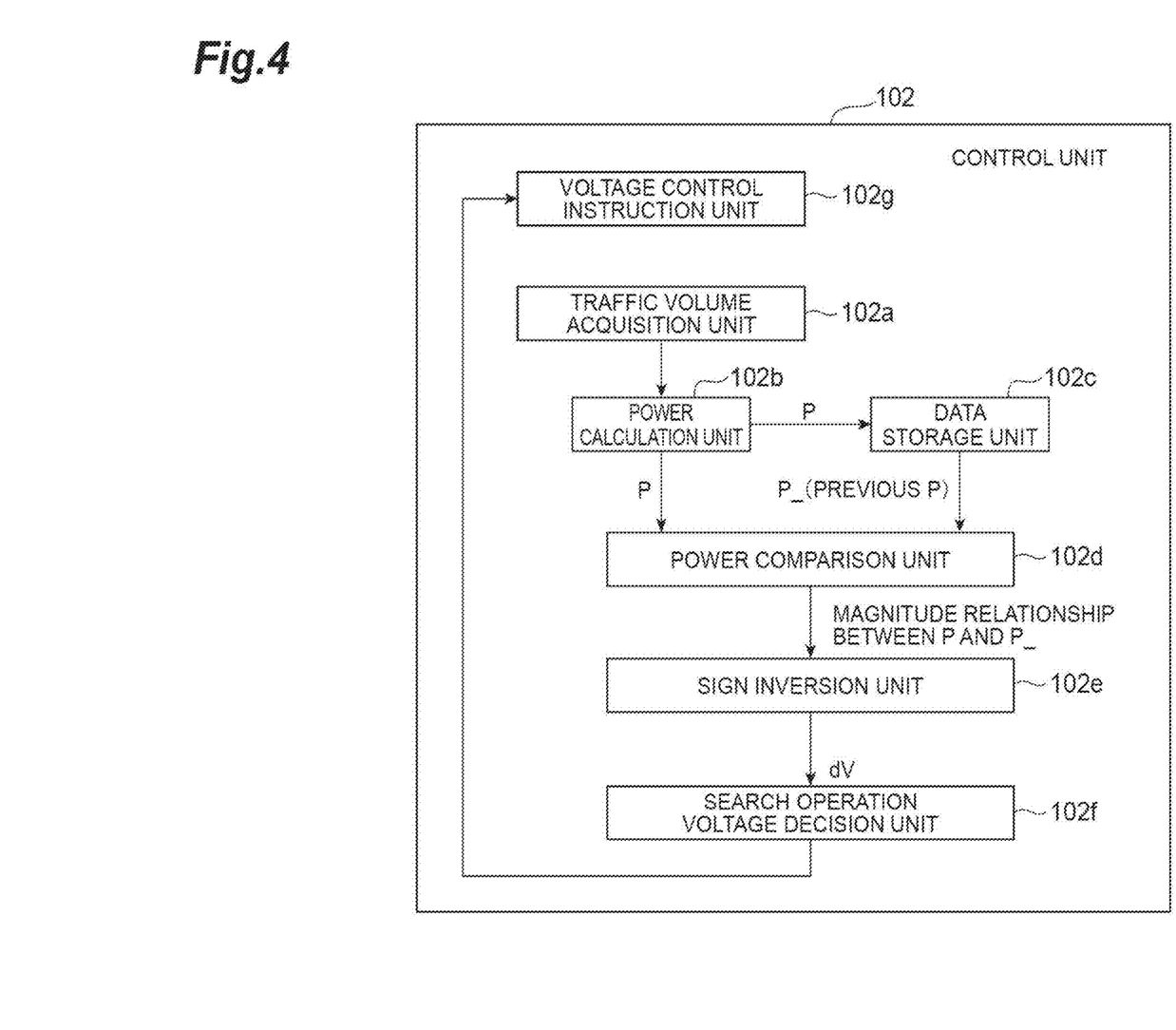
FIG. 4 is a block diagram showing a configuration of a control unit according to Embodiment 1.

The rectifier 100 according to Embodiment 1 of the present disclosure will be further described with reference to FIGS. 2 to 4. For the electric power control of the present disclosure, the rectifier 100 is effectively used. FIG. 2 is a block diagram showing a functional configuration of the rectifier 100. As shown in FIG. 2, the rectifier 100 includes a rectification/voltage adjustment unit 101, a control unit 102, a current sensor 103, and a voltage sensor 104.

The rectifier 100 is directly connected to the solar power generation device 200 and the 48 V bus, and therefore electric power is fed to the communication device 300 while the storage battery 400 is being float-charged. Furthermore, simultaneously with this, the solar power generation device 200 preferentially feeds the generated electric power to the communication device 300.

The rectification/voltage adjustment unit 101 is a part that adjusts the output voltage (rectifier voltage) of the rectifier 100.

The control unit 102 is a part that acquires information indicating an operation state (for example, a traffic volume) from the communication device 300 and controls the rectification/voltage adjustment unit 101 on the basis of the information.

The current sensor 103 and the voltage sensor 104 are sensors that detect a current and voltage within the rectifier 100 adjusted by the rectification/voltage adjustment unit 101, respectively.

The operation of the rectifier 100 configured as described above will be schematically described below. The rectification/voltage adjustment unit 101 adjusts an output voltage according to control by the control unit 102 and sets the output voltage as an optimal operation voltage of the solar power generation device 200. Thereby, it is possible to maximize the output power of the solar power generation device 200 that varies with an amount of solar radiation and the like. Power consumption W of the communication device 300 is a power value corresponding to the traffic volume. Therefore, the control unit 102 needs to maximize a value obtained by subtracting rectifier output power P' (whose sign is positive in a direction toward the communication device 300 and negative in a direction toward the storage battery 400) of the rectifier 100 from power consumption W of the communication device 300 estimated on the basis of data of the traffic volume acquired from the communication device 300 so that electric power P generated by the solar power generation device 200 is maximized.

In the present disclosure, the control unit 102 controls a rectifier voltage so that the value obtained by subtracting the output power of the rectifier 100 from the power consumption of the communication device 300 is maximized.

The current sensor 103 and the voltage sensor 104 inside the rectifier 100 measure a current and voltage. The control unit 102 derives the rectifier output power P' on the basis of the current and voltage. Thereby, it is possible to confirm an increase or decrease of the rectifier output power when the rectifier voltage is changed.

Next, a general outline of a control process of changing the rectifier voltage so that the value obtained by subtracting the output power of the rectifier 100 from the power consumption of the communication device 300 is maximized will be described. FIG. 3 is a diagram showing a relationship between an amount of solar radiation and the rectifier voltage/current (an optimal operation point). As shown in FIG. 3, a relationship between the voltage and current changes with each amount of solar radiation. The optimal operation point indicates a point at which electric power generated in the solar power generation process is maximized (a combination of the voltage and current). In the present disclosure, for example, it is assumed that the rectifier voltage is 50 V, the amount of solar radiation is 200 W/m$^2$, and there is no change in the power consumption of the communication device 300.

At this time, if the voltage is increased by 0.1 V, electric power generated by the solar power generation device 200 increases. If the electric power generated by the solar power generation device 200 increases, because the rectifier output power decreases, the rectifier voltage is increased by 0.1 V as it is. Likewise, an operation for increasing the voltage by 0.1 V is performed when the voltage is 50.1 V. When this operation is iterated, the rectifier voltage eventually rises to a voltage exceeding the optimal operation voltage of the solar power generation device 200 (see the optimal operation point in FIG. 3). At this time, if the rectifier voltage is increased by 0.1 V, the electric power generated by the solar power generation device 200 decreases. If the generated power decreases, the rectifier output power rises, and therefore the rectifier voltage is controlled so that it is not increased by 0.1 V and is decreased by 0.1 V. In this method, the rectifier output power can be kept at the minimum and the output power of the solar power generation device 200 can be kept at the maximum.

The control unit 102, which performs this control process, will be described. FIG. 4 is a block diagram showing a functional configuration of the control unit 102. As shown in FIG. 4, the control unit 102 is configured to include a traffic volume acquisition unit 102*a*, a power calculation unit 102*b*, a data storage unit 102*c*, a power comparison unit 102*d*, a sign inversion unit 102*e*, a search operation voltage decision unit 102*f*, and a voltage control command unit 102*g*.

The traffic volume acquisition unit 102*a* is communicatively connected to the communication device 300 and is a part that acquires the traffic volume of data transmitted and received by the communication device 300. This traffic volume is assumed to be a traffic volume per predetermined unit of time.

The power calculation unit 102*b* is a part that calculates the electric power of the communication device 300 and the electric power output from the rectifier 100 corresponding to the traffic volume. In general, as the traffic volume in a communication process of the communication device 300 increases, an amount of electric power thereof increases. The power calculation unit 102*b* calculates an amount of electric power corresponding to the traffic volume using a predetermined calculation formula or a corresponding table.

The data storage unit 102*c* is a part that stores the generated power P calculated by the power calculation unit 102*b*. The data storage unit 102*c* stores the generated power P calculated by the power calculation unit 102*b* together with a calculation time thereof.

The power comparison unit 102*d* is a part that compares the generated power P calculated by the power calculation unit 102*b* with previously generated power P_stored in the data storage unit 102*c*. In the present disclosure, the power comparison unit 102*d* obtains a difference dP by calculating (generated power P−generated power P_) and obtains a sign of the difference dP. That is, it is determined whether the difference dP is less than or greater than 0.

The sign inversion unit 102*e* is a part that inverts a sign of a search voltage dV on the basis of a comparison result.

That is, the sign inversion unit 102e inverts the sign of the search voltage dV when dP is less than 0.

The search operation voltage decision unit 102f is a part that decides a search operation voltage corresponding to the rectifier voltage of the rectifier 100. The search operation voltage decision unit 102f obtains a rectifier voltage V ($-V_0+dV$) of the rectifier 100 on the basis of the sign of the search voltage dV.

Figure 5:
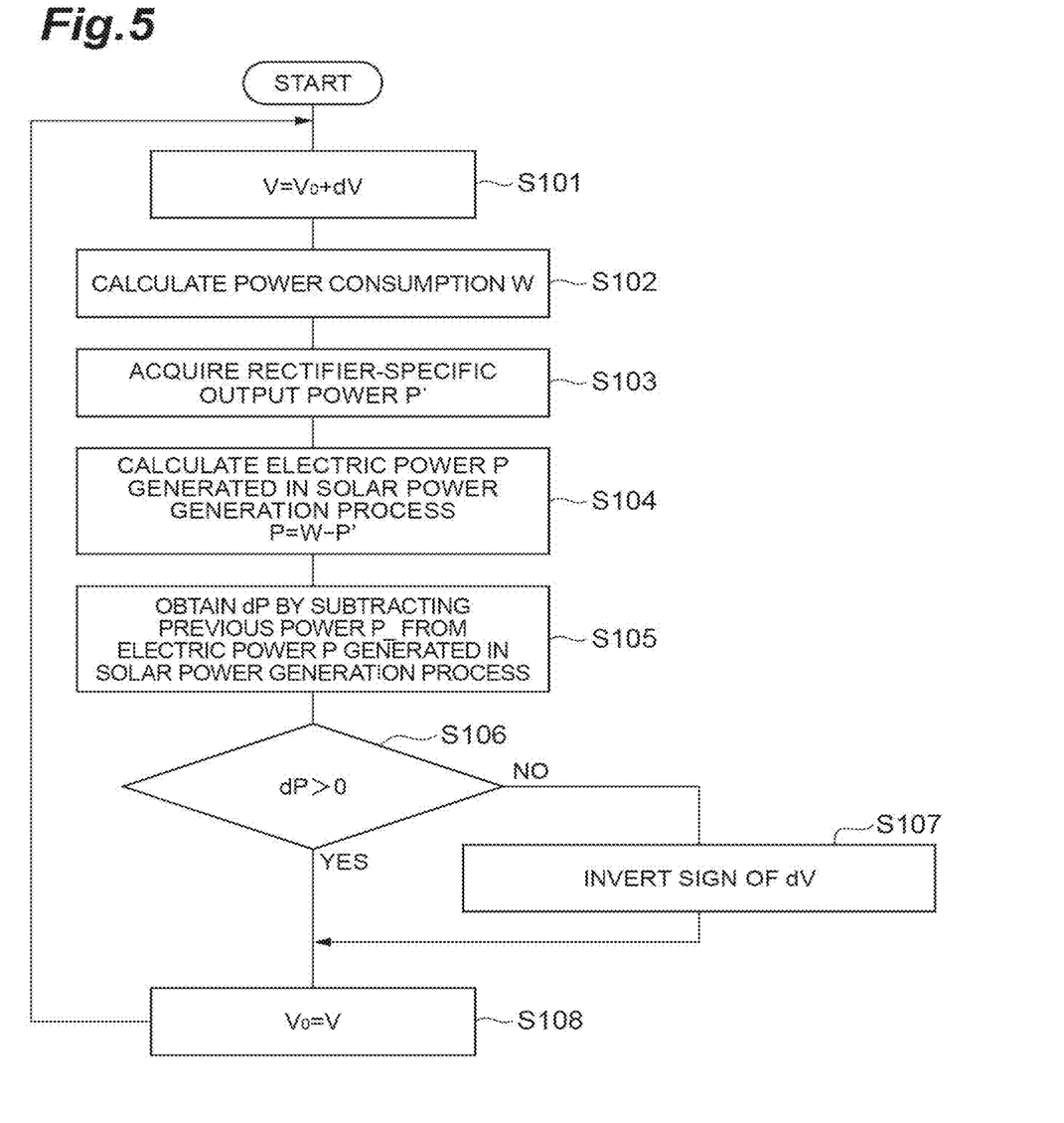
FIG. 5 is a flowchart for describing an operation of the control unit according to Embodiment 1.

Next, an operation of the control unit 102 will be described. FIG. 5 is a flowchart showing the operation of the control unit 102. First, the rectifier voltage $V=V_0+dV$ of the rectifier 100 is set (S101). The voltage $V_0$ is an initial rectifier voltage of the rectifier 100 and dV denotes a search voltage. In the present disclosure, a rectifier voltage at which electric power generated in the solar power generation process is maximized is searched for by performing an addition or subtraction operation according to the sign of the search voltage dV.

The power calculation unit 102b calculates power consumption W of the communication device 300 from a traffic volume in a communication process of the communication device 300 (S102). The data storage unit 102c stores the power consumption W.

Next, the power calculation unit 102b acquires the rectifier output power P' on the basis of the rectifier voltage V (S103). Moreover, the power calculation unit 102b calculates the electric power P generated in the solar power generation process (S104). The electric power P generated in the solar power generation process is obtained according to (power consumption W-rectifier output power P').

The power comparison unit 102d obtains a difference dP by calculating (electric power P generated in solar power generation process–electric power P_generated in solar power generation process) (P_ denotes previous power) (S105). Here, it is determined whether or not the difference dP>0 (S106). Here, in the case where the difference dP>0, the sign inversion unit 102e does not change the sign of the search voltage dV and the initial voltage $V_0$ is set to the rectifier voltage V. Moreover, when it is not the case that the difference dP>0, the sign inversion unit 102e inverts the sign of the search voltage dV (S107) and the search operation voltage decision unit 102f sets the rectifier voltage V obtained in processing S101 to the initial voltage $V_0$ (S108). Also, returning to S101, the search operation voltage decision unit 102f decides the rectifier voltage (search operation voltage) of the rectifier 100 by adding the search voltage dV whose sign has been processed (in a sign inversion process as necessary). The voltage control command unit 102g sends the decided rectifier voltage to the rectification/voltage adjustment unit 101 and causes an operation based on the voltage to be performed.

According to this configuration, the rectifier voltage can be adjusted to maximize electric power generated in the solar power generation process.

Here, the action effect of the DC power supply system 1 including the rectifier 100 in Embodiment 1 will be described.

The DC power supply system 1 of the present disclosure is a system including the rectifier 100 connected to the commercial power 500 and configured to supply electric power to the communication device 300 that is a load device and the solar power generation device 200 configured to supply electric power to the communication device 300.

In the rectifier 100, the traffic volume acquisition unit 102a acquires the operation state (the traffic volume) of the communication device 300, and the power calculation unit 102b functions as a power consumption acquisition unit and acquires power consumption of the communication device 300 corresponding to the traffic volume. Moreover, the power calculation unit 102b acquires output power from the rectifier 100.

Also, the power comparison unit 102d functions as a generated solar power acquisition unit and acquires the electric power generated by the solar power generation device 200 on the basis of the power consumption W of the communication device 300 and the rectifier output power P' of the rectifier 100. The search operation voltage decision unit 102f functions as a voltage control unit together with the power comparison unit 102d and the sign inversion unit 102e and decides the rectifier voltage of the rectifier 100 using a sign of the search voltage dv decided by the sign inversion unit 102e so that the electric power generated by the solar power generation device 200 is increased.

Here, the power comparison unit 102d sets a value obtained by subtracting the output power P' of the rectifier 100 from the power consumption W of the communication device 300 as the electric power P generated in the solar power generation process. Also, the search operation voltage decision unit 102f decides the rectifier voltage of the rectifier 100 so that the electric power generated by the solar power generation device 200 is maximized.

Thereby, it is possible to maximize the electric power generated by the solar power generation device 200 while considering the operation of the communication device 300. Although a method of adjusting the rectifier voltage so that the output power of the rectifier 100 is minimized is conceivable to cause the solar power generation device 200 to maximally generate electric power, each frequency band of the communication device may be switched on/off in accordance with the traffic volume in sleep control or the like in the communication device 300 and its power consumption changes. Therefore, it is difficult to continuously maximize electric power generated in the solar power generation process. In the present disclosure, the rectifier voltage can be controlled in accordance with the operation state of the communication device 300 in this way, and the electric power generated by the solar power generation device 200 can be appropriately maximized.

In the present disclosure, the power comparison unit 102d having a function of the voltage control unit determines a change in the solar power generation device 200 and the search operation voltage decision unit 102f increases or decreases the rectifier voltage V of the rectifier 100 on the basis of the change. For example, the power comparison unit 102d can determine the change by comparing electric power P currently generated by the solar power generation device 200 with electric power P_previously generated thereby. Also, the sign inversion unit 102e can perform a sign inversion process on the basis of the change and the search operation voltage decision unit 102f can decide the rectifier voltage.

In the present disclosure, for example, the load device is the communication device 300. The operation state is based on a traffic volume of data in a communication process of the communication device 300. Of course, the load device is not limited to the communication device 300. It is only necessary for the load device to be a device to which electric power is fed from the outside. Moreover, the traffic volume is checked to determine the operation state as an example. In addition, the operation state of the CPU or the like may be directly checked.

Embodiment 2

Figure 6:
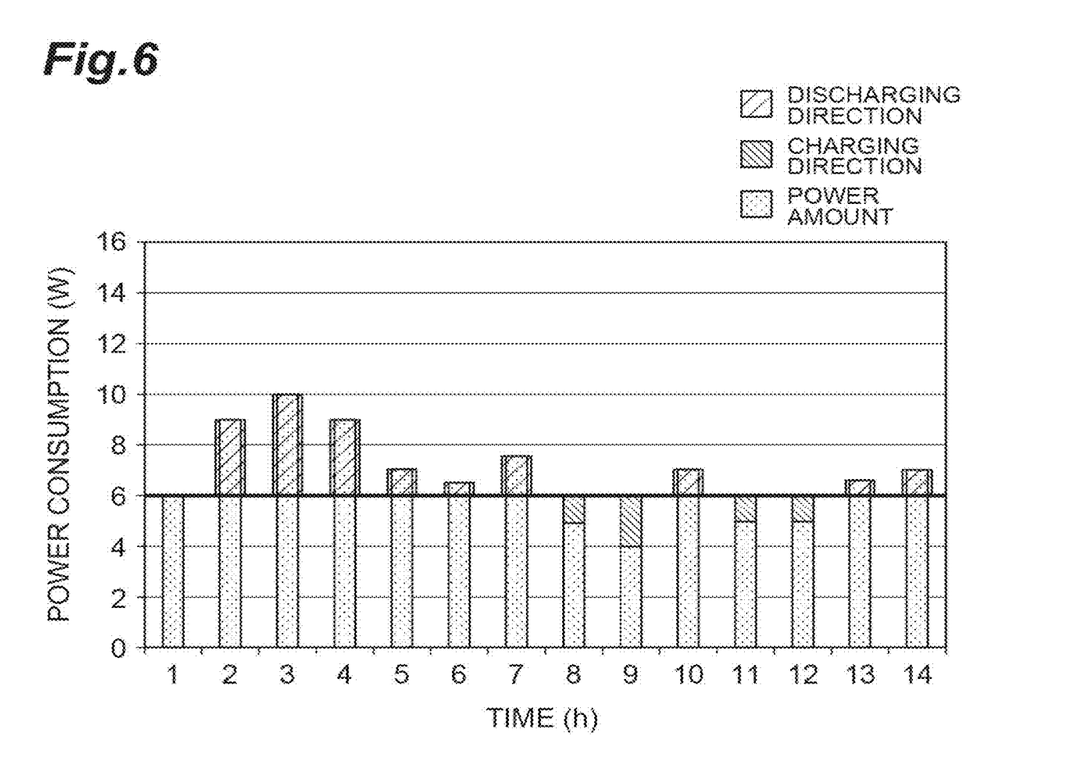
FIG. 6 is a diagram showing an example of a power consumption transition of a communication device in sleep control.

Next, a rectifier 100 according to Embodiment 2 of the present disclosure will be described with reference to FIGS. 6 to 8.

In the power control process effectively using the rectifier 100 according to Embodiment 1 of the present disclosure, it is possible to feed electric power to the communication device 30 while keeping the output power of the solar power generation device 200 at the maximum by keeping a value obtained by the output power P' of the rectifier 100 from the power consumption W of the communication device 300 at the maximum and float-charging the storage battery 400 (charging the storage battery 400 with generated surplus power according to a situation). On the other hand, as shown in FIG. 6, from the viewpoint of averaging the received power, it is possible to suppress a power demand value and reduce an electricity fee using the commercial power 500 according to charging/discharging control in which discharging is performed at the time of a traffic volume in which the power consumption is above the average power consumption (e.g. 6 W) and charging is performed at the time of a traffic volume in which the power consumption is below the average power consumption. Hereinafter, a process for appropriately charging a storage battery 400 while maximizing electric power generated by a solar power generation device 200 will be described.

Figure 7:
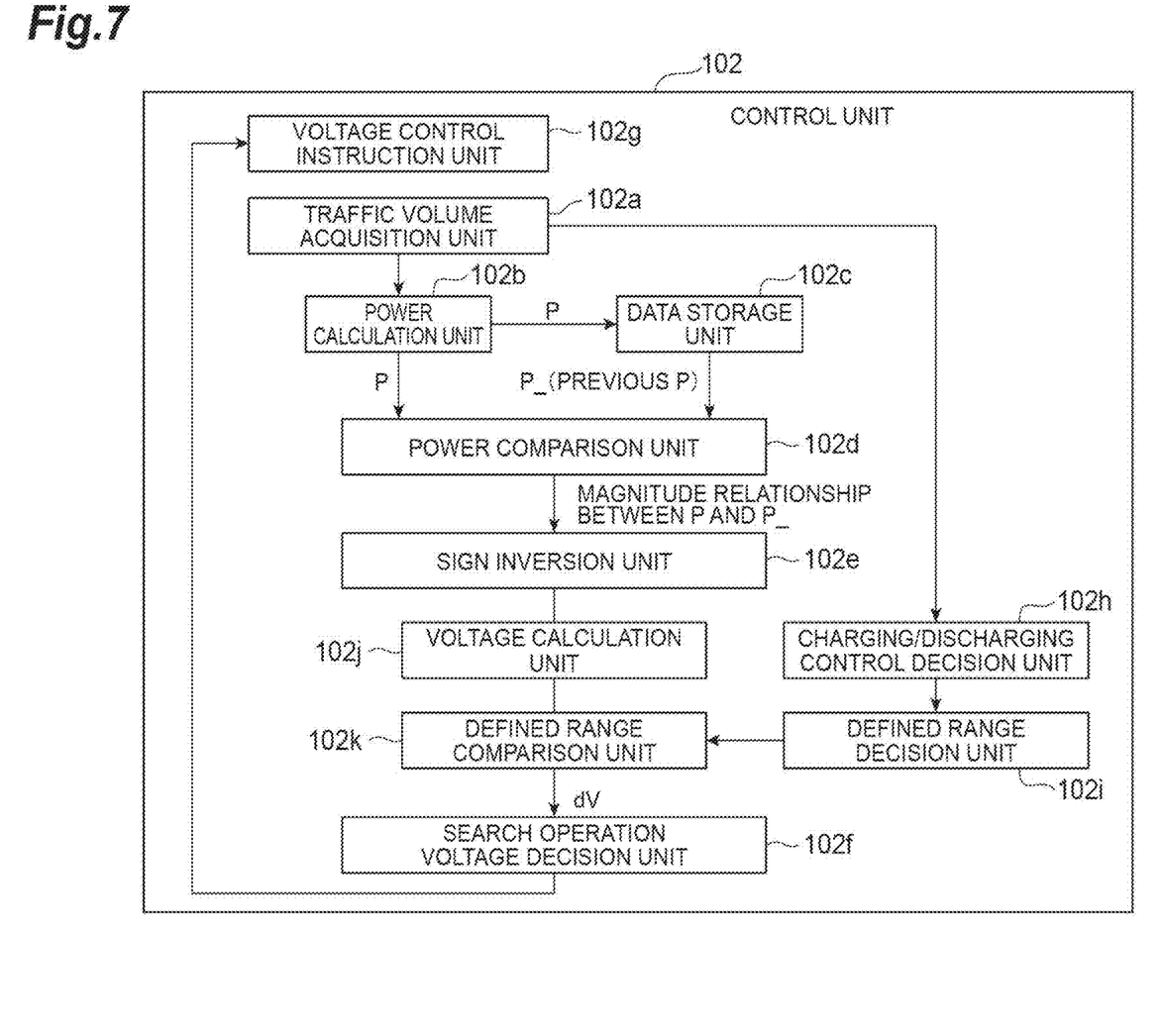
FIG. 7 is a block diagram showing a configuration of a control unit according to Embodiment 2.

FIG. 7 is a block diagram showing a functional configuration of a control unit 102 provided in the rectifier 100 of the present disclosure. As shown in FIG. 7, the control unit 102 further includes a charging/discharging control decision unit 102h, a defined range decision unit 102i, a voltage calculation unit 102j, a defined range comparison unit 102k in addition to a traffic volume acquisition unit 102a, a power calculation unit 102b, a data storage unit 102c, a power comparison unit 102d, a sign inversion unit 102e, a search operation voltage decision unit 102f, and a voltage control command unit 102g.

The charging/discharging control decision unit 102h is a part that decides whether to charge the storage battery 400 or discharge the storage battery 400 on the basis of a traffic volume of the communication device 300 acquired in the traffic volume acquisition unit 102a. The charging/discharging control decision unit 102h decides whether to charge the storage battery 400 or discharge the storage battery 400 on the basis of average power consumption calculated in advance. The charging/discharging control decision unit 102h holds average power consumption in advance and decides whether to charge or discharge the storage battery 400 on the basis thereof. In addition, as shown in FIG. 6, charging/discharging may be defined for each time period and the charging/discharging control decision unit 102h may determine charging or discharging corresponding to the time thereof.

The defined range decision unit 102i is a part that has a management table in which a voltage for charging (a charging voltage) and a voltage for discharging (a discharging voltage) are associated for a state of charge (SOC) (battery capacity) of the storage battery 400 and decides a rectifier voltage of the rectifier 100 on the basis of the management table. For example, when the defined range decision unit 102i decides to charge the storage battery 400 in the charging/discharging control decision unit 102h, the SOC of the storage battery 400 is acquired and a voltage associated with the SOC is acquired.

The voltage calculation unit 102j is a part that replaces a rectifier voltage V with an initial voltage $V_0$.

The defined range comparison unit 102k is a part that compares the rectifier voltage V calculated by the voltage calculation unit 102j with the voltage (defined range) decided by the defined range decision unit 102i. The defined range comparison unit 102k decides a sign of a search voltage dV in accordance with a comparison result. For example, because a control process is performed so that the voltage is decreased when the voltage of the voltage calculation unit 102j is higher than the voltage decided by the defined range decision unit 102i, the defined range comparison unit 102k sets the sign of the search voltage dV to a negative sign. Because a control process is performed so that the voltage is raised when the voltage of the voltage calculation unit 102j is lower than the voltage decided by the defined range decision unit 102i, the defined range comparison unit 102k sets the sign of the search voltage dV to a positive sign.

The search operation voltage decision unit 102f is a part that decides a search operation voltage corresponding to the rectifier voltage of the rectifier 100. The search operation voltage decision unit 102f obtains the rectifier voltage $V=V_0+dV$ of the rectifier 100 on the basis of the sign of the search voltage dV.

Next, an operation of the control unit 102 will be described. FIG. 8 is a flowchart showing the operation. A control process of maximizing electric power in a solar power generation process from processing S101 to processing S107 is the same as that of FIG. 5. That is, the control unit 102 calculates electric power P generated in the solar power generation process on the basis of the rectifier voltage V obtained by adding the search voltage dV to the initial voltage $V_0$, power consumption W of the communication device 300, and rectifier output power P'. The control unit 102 determines an increase/decrease in the electric power P generated in the solar power generation process and decides the sign of the search voltage dV on the basis of the increase/decrease.

Figure 8:
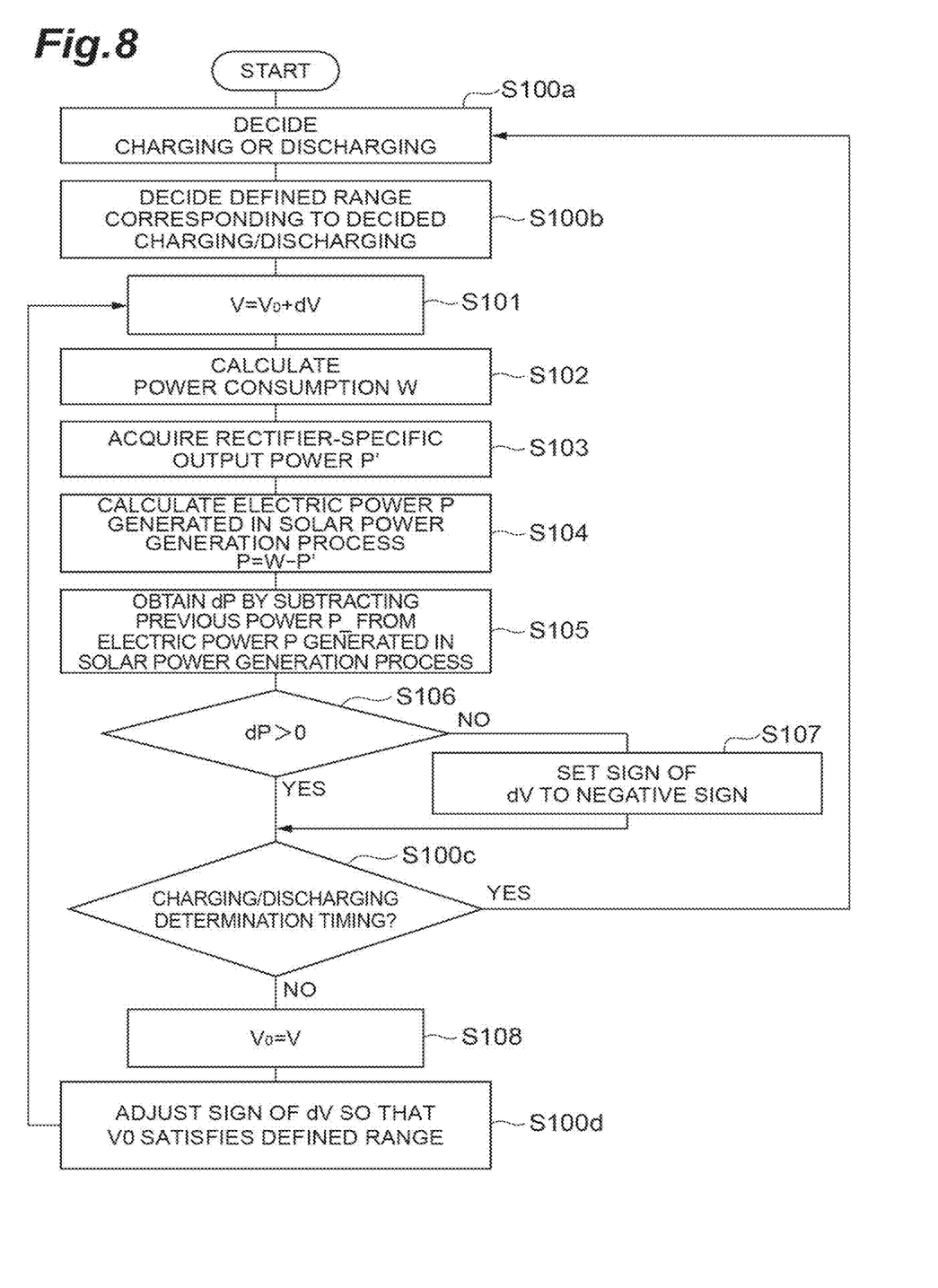
FIG. 8 is a flowchart for describing an operation of the control unit according to Embodiment 2.

In FIG. 8, first, the charging/discharging control decision unit 102h decides whether to charge the storage battery 400, whether to discharge the storage battery 400, or whether to do nothing (S100a). Also, the defined range decision unit 102i decides a defined range on the basis of an SOC of the storage battery 400 (S100b). This defined range is information indicating a range of a discharging voltage in the case of discharging and a range of a discharging voltage in the case of charging.

Also, the control unit 102 determines the rectifier voltage V so that electric power in the solar power generation process is maximized in the range indicated in this defined range (S101 to S107). In addition, the sign of dV is set to the negative sign in processing S107 of FIG. 8, but the sign of the most recent voltage dV may be inverted (or set to the positive sign).

Also, the charging/discharging control decision unit 102h determines a charging/discharging determination timing (S100c) and returns to processing S100a when the determination timing has been reached. When the determination timing has not been reached, the process moves to processing S100d. This determination timing is determined in accordance with a time period shown in FIG. 6 (for example, determined at 0 minutes per hour), but may not be based thereon. The determination timing may be decided on the basis of a traffic volume of the communication device 300.

The voltage calculation unit 102j sets the voltage V to voltage $V_0$ (S108) and the defined range comparison unit 102k compares the voltage $V_0$ derived by the voltage calculation unit 102j with the defined range decided by the defined range decision unit 102i and determines whether the voltage $V_0$ satisfies the defined range. Here, in processing S100b, when it is determined to perform discharging and when the voltage $V_0$ is less than the discharging voltage defined in the defined range (or satisfies the defined range), nothing is done and the sign of dV decided in processing S107 is adopted.

When the voltage $V_0$ is greater than or equal to the discharging voltage (or does not satisfy the defined range), the sign of the search voltage dV is set to the negative sign and a control process is performed in a direction in which the rectifier voltage V decreases. In this case, the sign of the search voltage dV decided in processing S107 is not adopted.

Moreover, in the case of charging, when the voltage $V_0$ is greater than or equal to the charging voltage (or satisfies the defined range), nothing is done. Here, the sign of processing S107 is adopted. Moreover, when the voltage $V_0$ is less than the charging voltage, the search voltage dV is set to a positive voltage and a control process is performed in a direction in which the rectifier voltage V is increased. In this case, the sign of dV decided in processing S107 is not adopted.

In addition, in processing S100a, when it is determined that neither charging nor discharging is performed, the defined range is not processed and a process is performed to maximize electric power generated in the solar power generation process. That is, nothing is done in processing 100d and the sign adopted in processing S107 is used for processing S101 to be performed after the return.

Moreover, in processing S107 and S100d, it is assumed that the rectifier voltage V is gradually increased as a premise. As shown in FIG. 3, the electric power increases as the rectifier voltage V gradually increases. On the other hand, after the operation point exceeds the optimal operation point, the electric power decreases as the voltage increases. Therefore, in processing S107 and S100d, when the voltage exceeding the optimal operation point is controlled, a control process is performed in a direction in which electric power increases when an adjustment is made in a direction in which a voltage decreases.

In this way, the rectifier voltage V can be increased or decreased so that the amount of power generated in the solar power generation process is maximized within the defined range and an appropriate rectifier voltage can be searched for.

In Embodiment 2, when the storage battery 400 needs to be charged (or discharged), a control process is performed so that the rectifier voltage is limited to a value greater than or equal to (or less than or equal to) a voltage required for charging (or discharging) based on the charging/discharging characteristic of the storage battery 400 and the output power of the solar power generation device 200 is kept at a maximum. Because the charging/discharging voltage of the storage battery 400 is uniquely determined according to the SOC (battery capacity) of the storage battery, the control unit 102 can control a process of charging/discharging the storage battery 400 by acquiring real-time SOC data.

For example, when electric power is desired to be fed to the communication device 300 by only the storage battery 400 and the solar power generation device 200, it is assumed that the rectifier voltage for maximizing electric power generated by the solar power generation device 200 is 52 V and the discharging voltage of the storage battery is 51 V. By setting the rectifier voltage of the rectifier 100 within a range of less than 51 V that is the discharging voltage in the defined range, the electric power generated by the solar power generation device 200 at a limited voltage can be maximized while enabling the discharging of the storage battery 400.

In the process of FIG. 8, the rectifier voltage at which the electric power generated by the solar power generation device 200 maximizes is generally adjusted to 51 V before reaching 52 V.

Moreover, it is assumed that the rectifier voltage of the rectifier 100 that maximizes the electric power generated by the solar power generation device 200 is 52 V and the charging voltage of the storage battery 400 is 53 V. By setting the rectifier voltage within a range of at least 53 V that is the charging voltage in the defined range, the electric power generated by the solar power generation device 200 at the limited voltage is maximized while enabling a process of charging the storage battery 400. However, at this time, when electric power cannot be fed to the communication device 300 by changing the voltage, the storage battery 400 is not charged so that a process of feeding electric power to the communication device 300 is prioritized.

In the process of FIG. 8, the rectifier voltage at which the electric power generated by the solar power generation device 200 is maximized reaches 52 V and then dV is repeatedly added until 53 V is reached without an adjustment to 52 V.

In this way, the rectifier voltage is increased in the direction in which electric power generated in the solar power generation process is maximized in the defined range and the sign of dV is adjusted to adjust the rectifier voltage. In the case of the charging process, because the rectifier voltage may be greater than or equal to the voltage defined in the defined range, the sign remains in the positive direction as a result. That is, even if the sign is negative due to sign inversion in processing S107, the sign may be changed to the positive sign in processing S107.

Next, the action effect of the DC power supply system 1 of Embodiment 2 of the present disclosure will be described.

The DC power supply system 1 of the present disclosure further includes the storage battery 400 connected to be charged with electric power from the solar power generation device 200 and the commercial power 500 and configured to feed the electric power to the load device. When the electric power generated by the solar power generation device 200 exceeds the power consumption of the communication device 300, the storage battery 400 is charged with generated surplus power.

According to this configuration, it is possible to effectively use electric power generated by the solar power generation device 200.

In the DC power supply system 1 of the present disclosure, the charging/discharging control decision unit 102h determines whether to discharge the storage battery 400 and feed electric power to the communication device 300 or whether to charge the storage battery 400 with electric power generated by the solar power generation device 200 on the basis of the relationship between the electric power generated by the solar power generation device 200 and the power consumption in the communication device 300. The defined range decision unit 102i, the defined range comparison unit 102k, and the search operation voltage decision unit 102f decide the rectifier voltage of the rectifier 100 on the basis of the determination.

The relationship between the generated power and the power consumption, for example, indicates which is larger by comparing the generated power with the previous average value of the power consumption at a predetermined timing. If the generated power is large, a determination is made to charge the storage battery 400 or the like.

On the other hand, a magnitude relationship between the average value of power consumption and the generated power may be classified according to each time period on the basis of a previous history of generated power and power consumption and discharging/charging may be determined on the basis of the classification.

Thereby, it can be determined that the solar power generation device 200 generates electric power serving as surplus power.

Moreover, the defined range decision unit 102i decides a defined range of the voltage for charging/discharging determined in accordance with the SOC of the storage battery 400. Also, the defined range comparison unit 102k controls the rectifier voltage on the basis of the defined range.

According to these configurations, an SOC is used to charge and discharge the storage battery 400 by controlling the rectifier voltage. Thereby, it is possible to control charging and discharging in a simple control process.

Although a control process in which a defined range is determined and electric power generated in the solar power generation process is maximized within the defined range in Embodiment 2 of the present disclosure, the present invention is not limited thereto. The rectifier voltage V for maximizing the electric power generated in the solar power generation process is obtained. From there, an adjustment may be made to decrease the rectifier voltage V so that the rectifier voltage V is included in the defined range.

Modified Example

Next, a modified example of the rectifier 100 according to the present embodiment will be described. In a process of controlling electric power to be generated in the solar power generation process effectively using the rectifier 100 according to the above embodiment, a value obtained by subtracting the output power of the rectifier 100 from the power consumption of the communication device 300 is kept at a maximum, and therefore the output power of the solar power generation device 200 is kept at the maximum. However, a converter having a maximum power point tracking (MPPT) function may be provided within the solar power generation device 200. In this case, a control process of keeping the output power of the solar power generation device 200 at a maximum is performed. Moreover, it may be used when there is no commercial power 500 (rectifier 100). Specifically, it is possible to perform any charging/discharging process by adjusting the output voltage of the solar power generation device 200 to the charging voltage or the discharging voltage.

Moreover, in the DC power supply system according to the above-described embodiment, when the communication device 300 is an AC input, an inverter device with the MPPT function for performing the conversion into an AC current immediately before the input of the communication device 300 may be provided. In this case, a control process of keeping the output power of the solar power generation device 200 at a maximum is performed. Moreover, this control process may be used when there is no rectifier 100. Specifically, the commercial power 500 is connected to the inverter device and the input voltage of the inverter is adjusted to the charging voltage or the discharging voltage, and therefore any charging/discharging can be performed and electric power can be supplied from the commercial power 500 to the communication device 300 when there is no power generation or storage amount. At this time, if there is no commercial power 500, an independent operation may be performed.

Moreover, in the DC power supply system according to the above-described embodiment, it may be used not only for the communication device 300 but also for other load devices that can receive the supply of electric power.

Moreover, a current sensor 103 and a voltage sensor 104 are provided inside the rectifier 100 to control electric power to be generated in the solar power generation process effectively using the rectifier 100 according to the above-described embodiment, but may be installed outside the rectifier 100. For example, if a current sensor is provided to measure the output current of the solar power generation device 200, because the electric power generated by the solar power generation device 200 can be measured, the voltage of the rectifier 100 can also be controlled so that electric power generated in the solar power generation process is maximized.

[Regarding hardware configuration, definition of terms, etc.] The block diagram used for the description of the above embodiments shows blocks of functions. Those functional blocks (component parts) are implemented by any combination of at least one of hardware and software. Further, a means of implementing each functional block is not particularly limited. Specifically, each functional block may be implemented by one physically or logically combined device or may be implemented by two or more physically or logically separated devices that are directly or indirectly connected (e.g., by using wired or wireless connection etc.). The functional blocks may be implemented by combining software with the above-described one device or the above-described plurality of devices.

The functions include determining, deciding, judging, calculating, computing, processing, deriving, investigating, looking up/searching/inquiring, ascertaining, receiving, transmitting, outputting, accessing, resolving, selecting, choosing, establishing, comparing, assuming, expecting, considering, broadcasting, notifying, communicating, forwarding, configuring, reconfiguring, allocating/mapping, assigning and the like, though not limited thereto. For example, the functional block (component part) that implements the function of transmitting is referred to as a transmitting unit or a transmitter. In any case, a means of implementation is not particularly limited as described above.

Figure 9:
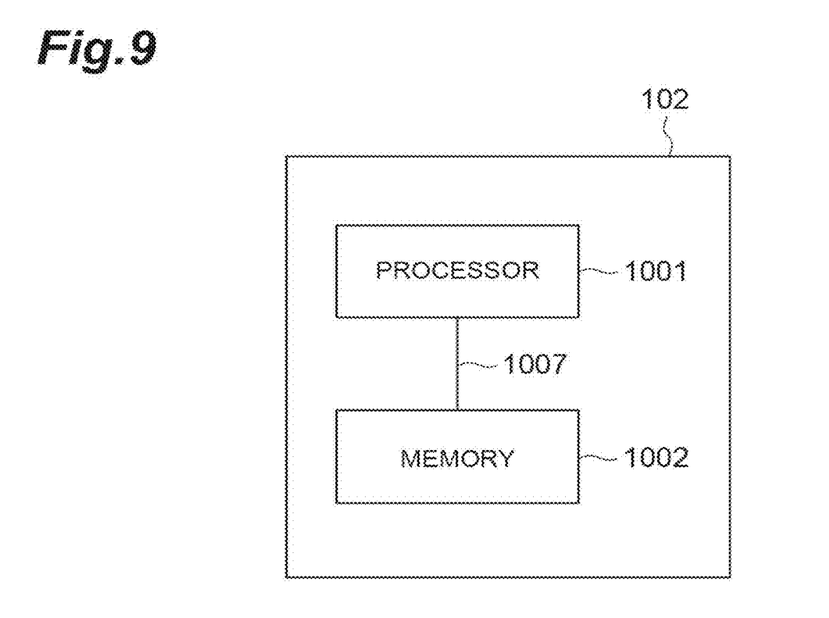
FIG. 9 is a diagram showing an example of a hardware configuration of a control unit 102 of a DC power supply system according to an embodiment of the present disclosure.

For example, the control unit 102 in the rectifier 100 according to one embodiment of the present disclosure may function as a computer that performs processing of a DC power supply processing method according to the present disclosure. FIG. 9 is a view showing an example of the hardware configuration of the control unit 102 of the DC power supply system according to one embodiment of the present disclosure. The control unit 102 described above may be physically configured as a computer device that includes a processor 1001, a memory 1002, a storage 1003, a communication device 1004, an input device 1005, an output device 1006, a bus 1007 and the like.

In the following description, the term "device" may be replaced with a circuit, a device, a unit, or the like. The hardware configuration of the control unit 102 may be configured to include one or a plurality of the devices shown in the drawings or may be configured without including some of those devices.

The functions of the control unit 102 may be implemented by loading predetermined software (programs) on hardware such as the processor 1001 and the memory 1002, so that the processor 1001 performs computations to control communications by the communication device 1004 and control at least one of reading and writing of data in the memory 1002 and the storage 1003.

The processor 1001 may, for example, operate an operating system to control the entire computer. The processor 1001 may be configured to include a CPU (Central Processing Unit) including an interface with a peripheral device, a control device, an arithmetic device, a register and the like. For example, the power calculation unit 102b and the like described above may be implemented by the processor 1001.

Further, the processor 1001 loads a program (program code), a software module and data from at least one of the storage 1003 and the communication device 1004 into the memory 1002 and performs various processing according to them. As the program, a program that causes a computer to execute at least some of the operations described in the above embodiments is used. For example, the control unit 102 may be implemented by a control program that is stored in the memory 1002 and operates on the processor 1001, and the other functional blocks may be implemented in the same way. Although the above-described processing is executed by one processor 1001 in the above description, the processing may be executed simultaneously or sequentially by two or more processors 1001. The processor 1001 may be implemented in one or more chips. Note that the program may be transmitted from a network through a telecommunications line.

The memory 1002 is a computer-readable recording medium, and it may be composed of at least one of ROM (Read Only Memory), EPROM (ErasableProgrammable ROM), EEPROM (Electrically ErasableProgrammable ROM), RAM (Random Access Memory) and the like, for example. The memory 1002 may be also called a register, a cache, a main memory (main storage device) or the like. The memory 1002 can store a program (program code), a software module and the like that can be executed for implementing a solar power generation control method according to one embodiment of the present disclosure.

In addition, the devices such as the processor 1001 and the memory 1002 are connected by the bus 1007 for communicating information. The bus 1007 may be a single bus or may be composed of different buses between different devices.

Further, the control unit 102 may include hardware such as a microprocessor, a DSP (Digital Signal Processor), an ASIC (Application Specific Integrated Circuit), a PLD (Programmable Logic Device), and an FPGA (Field Programmable Gate Array), and some or all of the functional blocks may be implemented by the above-described hardware components. For example, the processor 1001 may be implemented with at least one of these hardware components.

Notification of information may be made by another method, not limited to the aspects/embodiments described in the present disclosure. For example, notification of information may be made by physical layer signaling (e.g., DCI (Downlink Control Information), UCI (Uplink Control Information)), upper layer signaling (e.g., RRC (Radio Resource Control) signaling, MAC (Medium Access Control) signaling, annunciation information (MIB (Master Information Block), SIB (System Information Block))), another signal, or a combination of them. Further, RRC signaling may be called an RRC message, and it may be an RRC Connection Setup message, an RRC Connection Reconfiguration message or the like, for example.

The procedure, the sequence, the flowchart and the like in each of the aspects/embodiments described in the present disclosure may be in a different order unless inconsistency arises. For example, for the method described in the present disclosure, elements of various steps are described in an exemplified order, and it is not limited to the specific order described above.

Input/output information or the like may be stored in a specific location (e.g., memory) or managed in a management table. Further, input/output information or the like can be overwritten or updated, or additional data can be written. Output information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each of the aspects/embodiments described in the present disclosure may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present disclosure is described in detail above, it is apparent to those skilled in the art that the present disclosure is not restricted to the embodiments described in this disclosure. The present disclosure can be implemented as a modified and changed form without deviating from the spirit and scope of the present disclosure defined by the appended claims. Accordingly, the description of the present disclosure is given merely by way of illustration and does not have any restrictive meaning to the present disclosure.

Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using at least one of wired technology (a coaxial cable, an optical fiber cable, a twisted pair and a digital subscriber line (DSL) etc.) and wireless technology (infrared rays, microwave etc.), at least one of those wired technology and wireless technology are included in the definition of the transmission medium.

The information, signals and the like described in the present disclosure may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present disclosure and the term needed to understand the present disclosure may be replaced by a term having the same or similar meaning. For example, at least one of a channel and a symbol may be a signal (signaling). Further, a signal may be a message. Furthermore, a component carrier (CC) may be called a cell, a frequency carrier, or the like.

Further, information, parameters and the like described in the present disclosure may be represented by an absolute value, a relative value to a specified value, or corresponding different information. For example, radio resources may be indicated by an index.

The names used for the above-described parameters are not definitive in any way. Further, mathematical expressions and the like using those parameters are different from those explicitly disclosed in the present disclosure in some cases. Because various channels (e.g., PUCCH, PDCCH etc.) and information elements (e.g., TPC etc.) can be identified by every appropriate names, various names assigned to such various channels and information elements are not definitive in any way.

Note that the term "determining" and "determining" used in the present disclosure includes a variety of operations. For example, "determining" and "determining" can include regarding the act of judging, calculating, computing, processing, deriving, investigating, looking up/searching/inquiring (e.g., looking up in a table, a database or another data structure), ascertaining or the like as being "determined" and "determined". Further, "determining" and "determining" can include regarding the act of receiving (e.g., receiving information), transmitting (e.g., transmitting information), inputting, outputting, accessing (e.g., accessing data in a memory) or the like as being "determined" and "determined". Further, "determining" and "determining" can include regarding the act of resolving, selecting, choosing, establishing, comparing or the like as being "determined" and "determined". In other words, "determining" and "determining" can include regarding a certain operation as being "determined" and "determined". Further, "determining (determining)" may be replaced with "assuming", "expecting", "considering" and the like.

The term "connected", "coupled" or every transformation of this term means every direct or indirect connection or coupling between two or more elements, and it includes the case where there are one or more intermediate elements between two elements that are "connected" or "coupled" to each other. The coupling or connection between elements may be physical, logical, or a combination of them. For example, "connect" may be replaced with "access". When used in the present disclosure, it is considered that two elements are "connected" or "coupled" to each other by using at least one of one or more electric wires, cables, and printed electric connections and, as several non-definitive and non-comprehensive examples, by using electromagnetic energy such as electromagnetic energy having a wavelength of a radio frequency region, a microwave region and an optical (both visible and invisible) region.

The description "on the basis of" used in the present disclosure does not mean "only on the basis of" unless otherwise noted. In other words, the description "on the basis of" means both of "only on the basis of" and "at least on the basis of".

When the terms such as "first" and "second" are used in the present disclosure, any reference to the element does not limit the amount or order of the elements in general. Those terms can be used in the present disclosure as a convenient way to distinguish between two or more elements. Thus, reference to the first and second elements does not mean that only two elements can be adopted or the first element needs to precede the second element in a certain form.

As long as "include", "including" and transformation of them are used in the present disclosure, those terms are intended to be comprehensive like the term "comprising". Further, the term "or" used in the present disclosure is intended not to be exclusive OR.

In the present disclosure, when articles, such as "a", "an", and "the" in English, for example, are added by translation, the present disclosure may include that nouns following such articles are plural.

In the present disclosure, the term "A and B are different" may mean that "A and B are different from each other". Note that this term may mean that "A and B are different from C". The terms such as "separated" and "coupled" may be also interpreted in the same manner.

REFERENCE SIGNS LIST

1 DC power supply system, 300 Communication device, 500 Commercial power, 200 Solar power generation device, 400 Storage battery, 100 Rectifier, rectification/voltage adjustment unit, 102 Control unit, 103 Current sensor, 104 Voltage sensor, 102a Traffic volume acquisition unit, 102b Power calculation unit, 102c Data storage unit, 102d Power comparison unit, 102e Sign inversion unit, 102f Search operation voltage decision unit, 102g Voltage control instruction unit, 102h Charging/discharging control decision unit, 102i Defined range decision unit, 102j Voltage calculation unit, 102k Defined range comparison unit

The invention claimed is:

1. A direct current (DC) power supply system having a rectifier connected to commercial power and configured to supply electric power to a load device and a solar power generation process of supplying electric power to the load device, the DC power supply system comprising:
    a power consumption acquisition unit configured to acquire power consumption of the load device corresponding to an operation state of the load device;
    an output power acquisition unit configured to acquire output power from the rectifier;
    a generated solar power acquisition unit configured to acquire electric power generated in the solar power generation process on the basis of the power consumption and the output power; and
    a voltage control unit configured to control a rectifier voltage of the rectifier so that the electric power generated in the solar power generation process is increased.

2. The DC power supply system according to claim 1,
    wherein the generated solar power acquisition unit sets a value obtained by subtracting the output power from the power consumption as the electric power generated in the solar power generation process, and
    wherein the voltage control unit controls the rectifier voltage of the rectifier so that the electric power generated in the solar power generation process is maximized.

3. The DC power supply system according to claim 2, wherein the voltage control unit determines a change in the electric power generated in the solar power generation process and increases or decreases the rectifier voltage of the rectifier on the basis of the change.

4. The DC power supply system according to claim 2,
    wherein the load device is a communication device, and
    wherein the operation state is based on a traffic volume of data in a communication process of the communication device.

5. The DC power supply system according to claim 2, further comprising a storage battery connected to be charged with electric power from the solar power generation process and the commercial power and configured to feed the electric power to the load device,
    wherein, when the electric power generated in the solar power generation process exceeds the power consumption, the storage battery is charged with generated surplus power.

6. The DC power supply system according to claim 1, wherein the voltage control unit determines a change in the electric power generated in the solar power generation process and increases or decreases the rectifier voltage of the rectifier on the basis of the change.

7. The DC power supply system according to claim 6, wherein the load device is a communication device, and
wherein the operation state is based on a traffic volume of data in a communication process of the communication device.

8. The DC power supply system according to claim 6, further comprising a storage battery connected to be charged with electric power from the solar power generation process and the commercial power and configured to feed the electric power to the load device,
wherein, when the electric power generated in the solar power generation process exceeds the power consumption, the storage battery is charged with generated surplus power.

9. The DC power supply system according to claim 1, wherein the load device is a communication device, and
wherein the operation state is based on a traffic volume of data in a communication process of the communication device.

10. The DC power supply system according to claim 9, further comprising a storage battery connected to be charged with electric power from the solar power generation process and the commercial power and configured to feed the electric power to the load device,
wherein, when the electric power generated in the solar power generation process exceeds the power consumption, the storage battery is charged with generated surplus power.

11. The DC power supply system according to claim 1, further comprising a storage battery connected to be charged with electric power from the solar power generation process and the commercial power and configured to feed the electric power to the load device,
wherein, when the electric power generated in the solar power generation process exceeds the power consumption, the storage battery is charged with generated surplus power.

12. The DC power supply system according to claim 11, further comprising a charging/discharging control decision unit configured to determine whether to discharge the storage battery and feed the electric power to the load device or whether to charge the storage battery with the electric power generated in the solar power generation process on the basis of a relationship between the electric power generated in the solar power generation process and the power consumption in the load device,
wherein the voltage control unit controls the rectifier voltage on the basis of the determination.

13. The DC power supply system according to claim 12, further comprising a defined range decision unit configured to decide a defined range of a voltage for charging or discharging determined in accordance with a battery capacity of the storage battery,
wherein the voltage control unit controls the rectifier voltage on the basis of the defined range.

14. The DC power supply system according to claim 11, further comprising a defined range decision unit configured to decide a defined range of a voltage for charging or discharging determined in accordance with a battery capacity of the storage battery,
wherein the voltage control unit controls the rectifier voltage on the basis of the defined range.

* * * * *